Aug. 15, 1961    C. R. WILSON ET AL    2,995,810
MACHINE FOR ASSEMBLING METAL SPOOLS
Filed Feb. 6, 1959    9 Sheets—Sheet 1

CLARENCE R. WILSON
MILTON E. MEERDINK
INVENTORS

BY R. Frank Smith

ATTORNEYS

Aug. 15, 1961 C. R. WILSON ET AL 2,995,810
MACHINE FOR ASSEMBLING METAL SPOOLS
Filed Feb. 6, 1959 9 Sheets-Sheet 3

CLARENCE R. WILSON
MILTON E. MEERDINK
INVENTORS

BY
ATTORNEYS

Aug. 15, 1961   C. R. WILSON ET AL   2,995,810
MACHINE FOR ASSEMBLING METAL SPOOLS
Filed Feb. 6, 1959   9 Sheets-Sheet 5

CLARENCE R. WILSON
MILTON E. MEERDINK
INVENTORS

BY R. Frank Smith

ATTORNEYS

CLARENCE R. WILSON
MILTON E. MEERDINK
INVENTORS

ATTORNEYS

Fig. 15

CLARENCE R. WILSON
MILTON E. MEERDINK
INVENTORS

ATTORNEYS

Fig. 18

CLARENCE R. WILSON
MILTON E. MEERDINK
INVENTORS

United States Patent Office 2,995,810
Patented Aug. 15, 1961

2,995,810
MACHINE FOR ASSEMBLING METAL SPOOLS
Clarence R. Wilson and Milton E. Meerdink, Rochester, N.Y., assignors to Eastman Kodak Company, Rochester, N.Y., a corporation of New Jersey
Filed Feb. 6, 1959, Ser. No. 791,653
7 Claims. (Cl. 29—208)

The present invention relates to improvements in a machine for producing spools of sheet metal, and more particularly to a machine for automatically assembling spools of sheet metal comprising a tubular hub, with a flange secured to each end of the hub, said spools being adapted for winding a web or band of material, such as photographic film strip, thereon.

In the machine under consideration, the three component parts of a spool comprising a top flange, bottom flange and a cylindrical hub, are loaded into the machine at three separate stations located around the periphery of an indexing table on a stationary work shelf. While the fixtures or nests attached to the indexing table are successively aligned with each of eight stations, the spool components are placed in the nests, various assembly and inspection operations are performed, and finished spools are delivered from the machine. The entire operating cycle is automatically controlled and manual operations are reduced to a minimum.

The invention has as its principal object the provision of a machine for automatically producing assembled spools from formed sheet metal components comprising a top flange, a bottom flange and a cylindrical hub member.

A further object of the invention is the provision of a mechanism for holding bottom flanges within nests attached to the table in such a manner that operations can be performed on both surfaces of these flanges.

Still another object of the invention is the provision of an arrangement and mechanism for locating a cylindrical hub on each bottom flange within the nest with the lugs on the bottom side of the hub in registry with corresponding holes in the bottom flange.

And still another object of the invention is the provision of an arrangement and mechanism for placing a top flange on each registered hub and bottom flange in the nest and for correctly locating the top flange to register the holes therein with the corresponding lugs on the top side of the cylindrical hub.

A further object of the invention is the provision of an arrangement and mechanism for permanently attaching the registered top and bottom flanges to the cylindrical hubs to form a spool.

A still further object of the invention is the provision of a machine of this type which is automatic in its operation, requires minimum attention and is positive in its results.

To these and other ends the invention resides in certain improvements and combinations of parts, all as will be hereinafter more fully described, the novel features being pointed out in the claims at the end of the specification.

DESCRIPTION OF SPOOL ASSEMBLY

The structure of the assembled spool forms no part of the present invention, but is described for the purpose of clarifying the description of the spool assembling machine.

Figure 1:
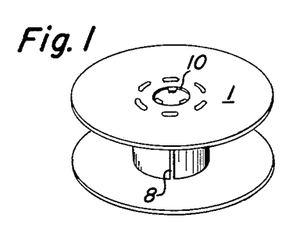
FIG. 1 is a perspective view of a complete spool.
Figure 2:
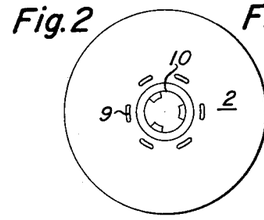
FIG. 2 is a plan view of the top spool flange.
Figure 3:
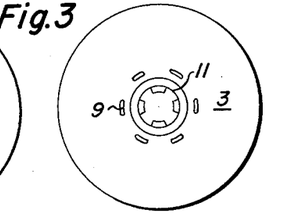
FIG. 3 is a plan view of the bottom spool flange.
Figures 4, 5, 6:
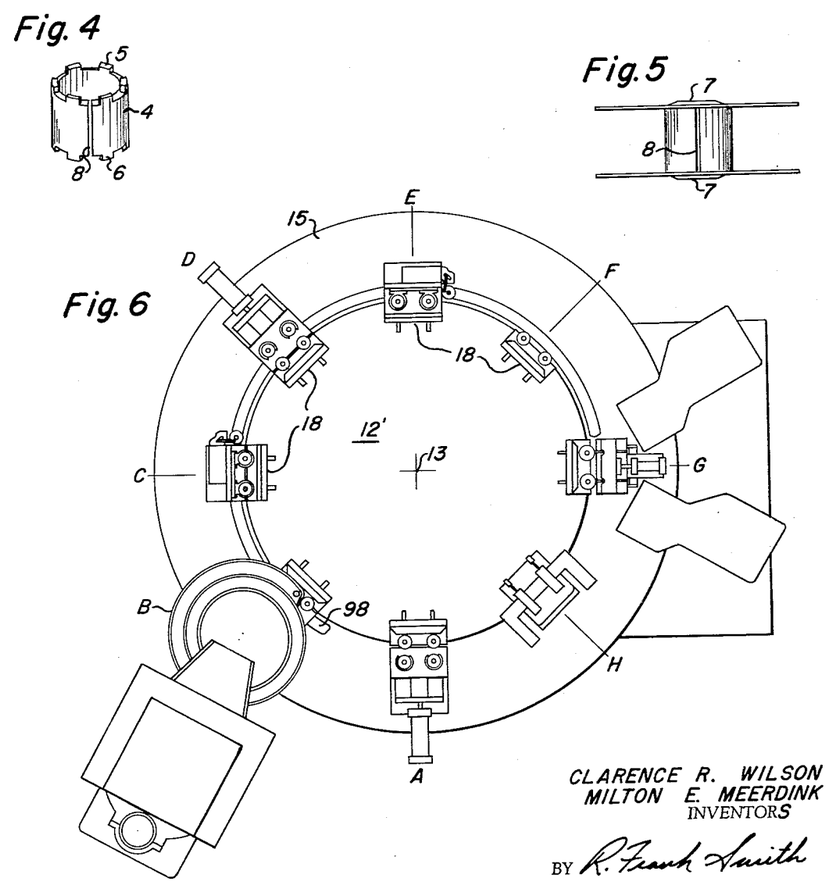
FIG. 4 is a perspective view of the spool hub.
FIG. 5 is a side elevation of a complete spool.
FIG. 6 is a plan view schematically showing the indexing table, the nests attached thereto and the location of various work stations on the machine.

An assembled spool 1 (FIG. 1) comprises two flat circular metal flanges designated as "top" 2 (FIG. 2) and "bottom" 3 (FIG. 3) permanently attached to a cylindrical metal hub 4 (FIG. 4) by means of six equally spaced rectangularly-shaped lugs designated as "upper" 5 and "lower" 6 at each end of the hub. Each flange is formed at its center section 7 as shown by the profile view (FIG. 5).

The hub 4 (FIG. 4) is formed from sheet metal by a conventional punch-and-die technique. Six equally spaced rectangularly-shaped lugs 5 and 6 are formed along each longitudinal edge of the strip. After blanking, the hub strip is formed into a cylindrical shape with its axial edges spaced a short distance apart, thus forming a guide slot 8 (FIG. 5) to later receive the leading end of a length of photographic film which is then wound on the spool.

Circular flat metal flanges 2 (FIG. 2) and 3 (FIG. 3) are also formed by a punch-and-die method. The top flange 3 is blanked from sheet metal with six equally spaced lug holes 9 (FIG. 2) concentric about the flange axis, shaped and spaced to register with the rectangular lugs 5 on the hub. The top flange has a three-spline opening 10 at its center. The bottom flange is identical to the top flange, but has a four-spline opening 11 (FIG. 3) at its center, which in cooperation with the three-spline opening in the top flange, insures correct orientation of the spool in a camera.

PRELIMINARY DESCRIPTION

Figure 7:
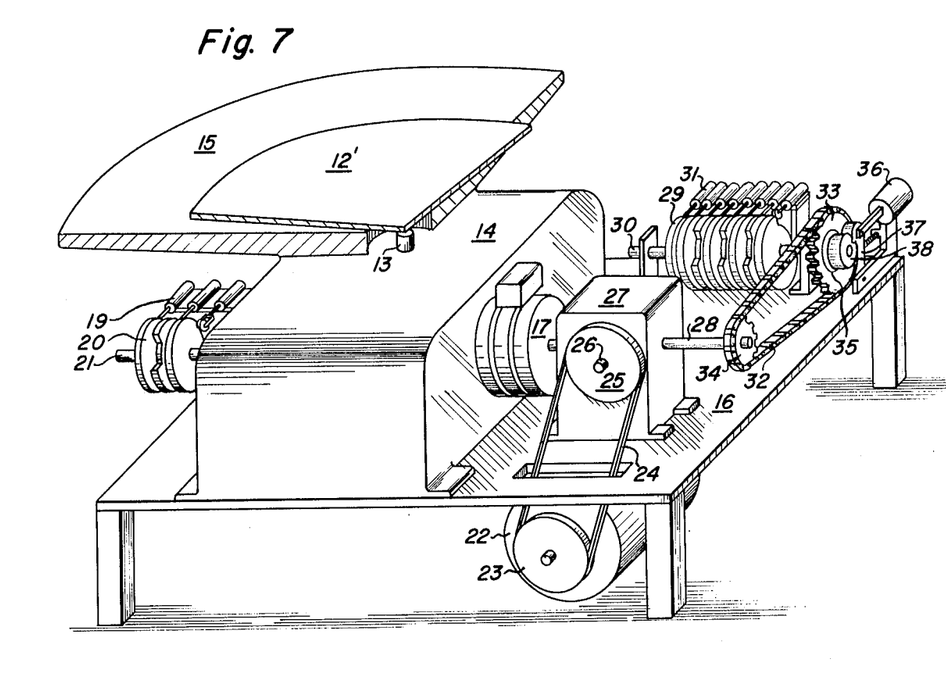
FIG. 7 is a perspective view schematically showing the indexing elements of the machine and the electrical control means.

The semi-automatic spool assembly machine FIG. 6, which is the subject of the present invention, employs an indexing table 12′ intermittently rotatable about axis 13. The indexing table is rotated by an indexing mechanism 14 (FIG. 7), details not shown, furnished by Ferguson Machine and Tool Co., St. Louis 21, Missouri, but not claimed as a part of the present invention. The indexing mechanism, indexing table and work shelf 15, are mounted on a supporting frame 16 (FIG. 7).

By means of a cam-controlled, electrically-actuated clutch-and-brake device 17, details not shown, furnished by Warner Clutch and Brake Co., Beloit, Wisconsin, but not claimed a part of the present invention, the nests 18 (FIG. 6) on the indexing table are successively aligned with the work stations on the work shelf. The intermittent rotation of the index table results when the indexing mechanism is actuated by the clutch section (not shown) of the clutch-and-brake mechanism. The rotation of the indexing table is stopped when the brake section (not shown) of the clutch-and-brake mechanism is actuated. The operation of the clutch-and-brake mechanism is controlled by a switch 19, actuated by cam 20 on driveshaft 21, and by a similar cam-and-switch arrangement on the auxiliary camshaft later described.

While the machine is operating, power is constantly transmitted from the electric motor 22 by means of pulley 23 V belt 24 and pulley 25 to the input shaft 26 of a gear reduction unit 27, details not shown. The driveshaft 20 is intermittently rotated at the same speed as the output shaft 28 of the gear reduction unit. In turn, the driveshaft actuates the indexing mechanism, which is connected directly to the indexing table.

Eight stations (FIG. 6) are permanently mounted on the stationary work shelf 15 which is concentric about the index table 12'. For descriptive clarity, the stations are designated by the letters A through H. The functions of the operating elements at each station are disclosed later, when the progressive assembly of the spool elements is described.

Cams 29 (FIG. 7) on auxiliary camshaft 30 actuate switches 31 which, through a suitable relay system, control the motions of the operating elements at each station, while the index table is stationary. The auxiliary camshaft is intermittently rotated by means of a chain 32 connecting the driven sprocket 33 to a constantly rotating driving sprocket 34. The auxiliary camshaft is engaged with the driven sprocket through a single-revolution clutch 35, when solenoid 36 is energized by a cam on driveshaft 21, and withdraws the spring-loaded latch 37 from engagement with the single-tooth ratchet wheel 38.

A series of eight equally spaced work-holding nests 18 (FIG. 6) are attached around the periphery of the index table so that the nests are simultaneously brought into radial alignment with each of the stations A through H.

Figure 8:
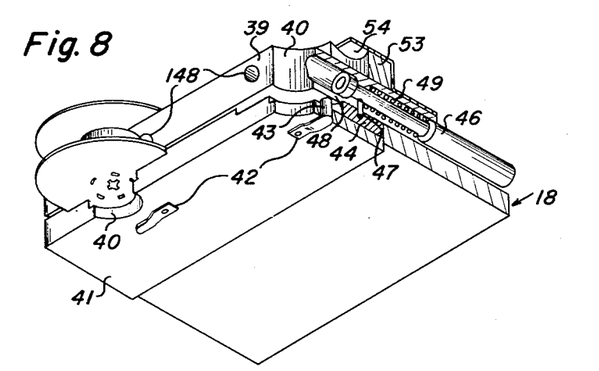
FIG. 8 is a fragmentary perspective view of a nest as viewed from below showing one spool retained in position in the nest.
Figure 9:
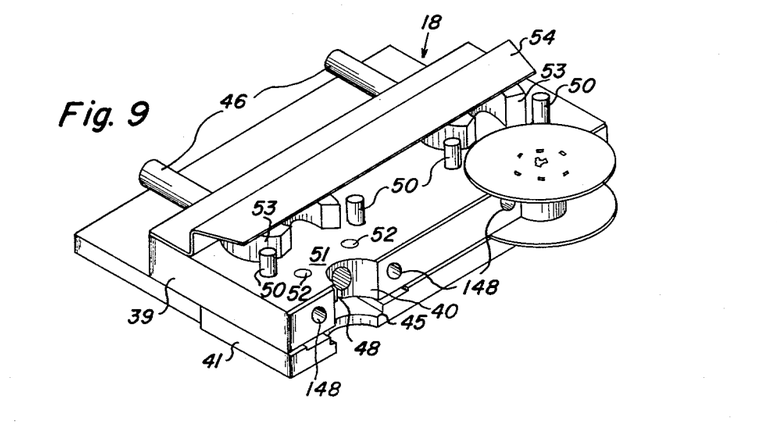
FIG. 9 is a perspective view of a nest as viewed from above showing one spool retained in position in the nest.

Each nest unit consists of a body 39 (FIG. 8) having two semi-cylindrical recesses 40, a guide block 41, and various other components as later described. Two leaf-type spring clips 42 are attached to the guide block 41 and bear against pressure buttons 43 extending through the guide block. The internal construction of the nest is shown by FIG. 8. Two ejector blades 44 are slidably mounted in guide slots 45 (FIG. 9) in the guide block. The ejector blades are attached to ejector rods 46 by pins 47 which pass through the slots 48 in the nest body. The ejector rods and blades are spring-loaded toward the center of the table by springs 49. Locating pins 50, extending through the nest body and into guide block, serve as positive stops to locate the flanges coaxially in the nest. To retain the steel top flanges against the nest surface 51 two cylindrical permanent magnets 52 (FIG. 9) are pressed into the nest body at each spool position. Two permanent horseshoe magnets 53 are fixed to the top surface of the nest by means of member 54 to hold the top flanges against the pins 50. If the flanges are formed of non-magnetic material, an equivalent construction is utilized.

GENERAL DESCRIPTION

At station A, while a nest is aligned therewith, two bottom flanges are simultaneously injected into the nest (FIG. 6) with the concave surfaces of their center sections 7 (FIG. 5) facing upward. The next indexing carries the nest containing the two bottom flanges to station B, where a hub is placed in vertical position atop each of these flanges. Then, the indexing table carries the nest containing the bottom flanges and hubs to station C, where the two hubs are oscillated about the axes of the flanges to cause the series of rectangular lugs on the bottoms of the hubs to be registered with the corresponding holes in the bottom flanges. The next indexing carries the table containing the hubs in registry with the bottom flanges into alignment with station D, where two top flanges, with the concave side of their center sections facing downward, are placed atop the registered hubs. The nest with the registered hubs and bottom flanges, and with a top flange atop each hub, but not necessarily registered therewith, is then indexed into alignment with station E. There, the top flanges are oscillated in the same manner as the hubs were oscillated at station C, to register the circle of holes in the top flanges with the upper lugs on the hubs. The next indexing carries the nest with the two properly registered flange-and-hub assemblies to a blank station F, where no assembly operations are performed. The succeeding indexing carries the nest with the registered flange-and-hub assemblies to station G, where the tips of the lugs protruding through both the top and bottom flanges are simultaneously riveted to permanently attach both flanges to each hub. Finally, the index table carries the nest with the two assembled spools to station H, where the assembled spools are ejected through an opening in the work shelf, into an inclined chute leading to a storage box.

DETAILED DESCRIPTION

Station A.—Inserting bottom flanges into the nest

Figure 10:
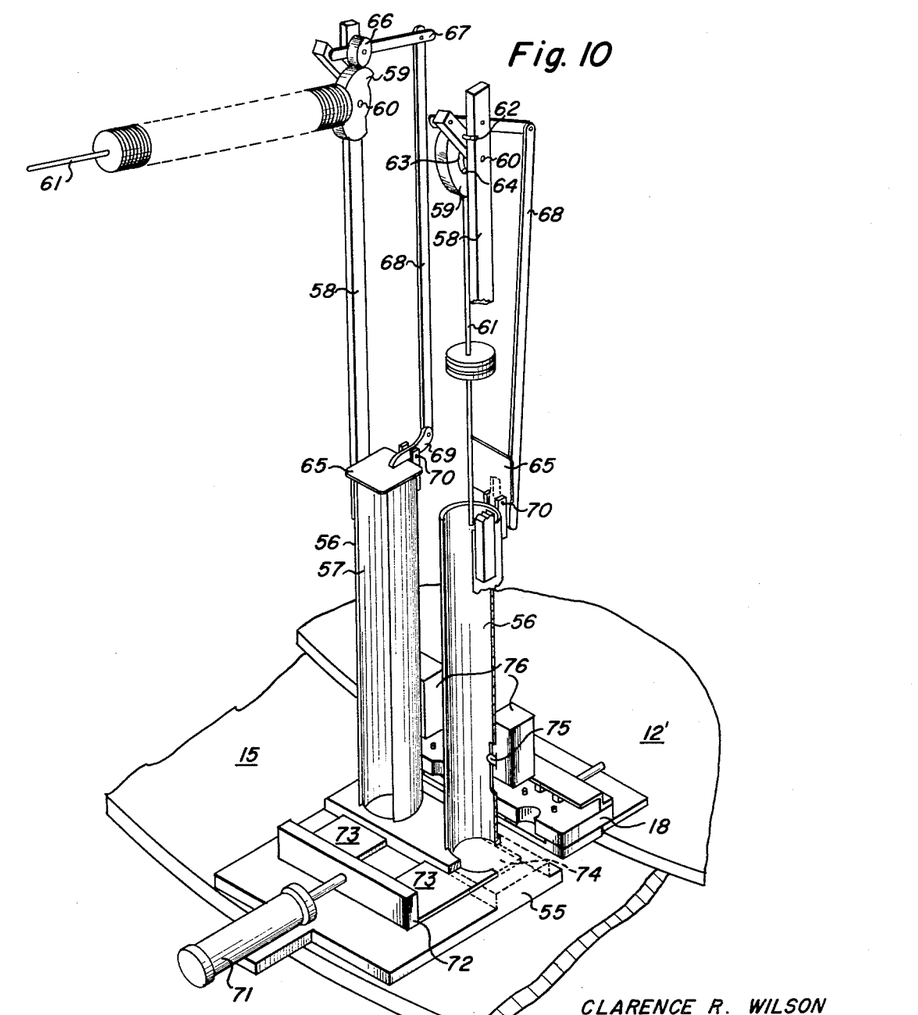
FIG. 10 is a perspective view of the operating elements at station A where the bottom flanges are loaded into the nest.

The operating elements at work station A, where two bottom flanges are simultaneously injected into an aligned nest, are shown in FIG. 10. A base 55, mounted on the stationary work shelf 15 supports two vertical magazine bodies 56. The magazine bodies comprise vertical tubes having inside diameters slightly larger than the outside diameter of the spool flanges, and having longitudinal slots 57 extending the full length thereof. Means for loading bottom flanges into the magazines are located on vertical support members 58 attached to each magazine body. A cam 59 is pivotally mounted on pin 60 near the top of each support member. Each cam has a loading rod 61 projecting radially from its face. The loading rods are splined to allow spool flanges having four-splined openings to be stacked upon the rod, and to prevent top flanges with three-spline openings from being slid onto the rod. To assure that the flanges are properly stacked upon each loading rod in such a manner that each flange fed into the magazine has its concave center surface facing downward, the operator obversely orients the flanges as they are slid onto the loading rod. Alternatively, the flanges may be stacked on carrier rods in uniform obverse orientation during the blanking operation, and may be transferred directly to the loading rods from the carrier rods. The position of the loading rod for loading the flanges thereon is shown in the upper left corner of FIG. 10. The rod is maintained in this position by the spring-loaded detent 62, which rides in a slot 63 and which engages a corresponding hole 64 when the loading rod is in position for loading flanges thereon. To transfer the column of flanges from the loading rod into the magazine, the operator pulls the detent out of the hole in the slot and manually pivots each loading rod successively into a vertical position, as shown above the cut-away magazine tube in FIG. 10. When the loading rod is pivoted into this vertical position, the magazine lid 65 opens to allow the end of the loading rod to enter the slotted section of the magazine body and to permit the flanges to be slid downwardly off the loading rod into the magazine. Opening of the lid is effected when roller 66 drops into the recessed portion of the cam 59, causing the weight of lever arm 67 and connecting bar 68 to push downward on lever arm 69, causing the magazine lid to pivot upward about pin 70. Raising the loading rod to its horizontal position reverses the operation and causes the magazine lid to close. This lid arrangement insures that only those flanges which were previously stacked upon the loading rod can be conveniently fed into the magazine.

Rotation of the auxiliary camshaft 30 (FIG. 7) by previously disclosed means, causes the actuation of air cylinder 71 (FIG. 10) which moves the yoke 72 and injector blades 73 toward the nest 18. Each injector blade, during the initial portion of its movement, engages the edge of the bottom flange in its corresponding magazine 56. The injector blades are slightly thinner than the flanges and the channels 74, through which the injector blades push the flanges, are only deep enough to allow one flange at-a-time to be removed from the bottom of the sack in the magazine. When two bottom flanges have been simultaneously injected into the nest, the flanges are retained within the nest by the tension of the spring-loaded pressure buttons 43 (FIG. 8) which maintain the top surfaces of the flanges in firm frictional contact with the lower surface of the nest body. After the flanges are injected, a cam on the auxiliary camshaft 30 (FIG. 7) causes the air cylinder 71 (FIG. 10) to be actuated in the opposite direction to return injector blades 73 to the position shown in FIG. 10. The withdrawal of the injector blades from beneath the column of stacked flanges in the magazines allows the column to settle, so that the bottom flange in each magazine is again in position to be engaged by the injector blades.

When levers 75 of switches 76 are not depressed by flanges in the magazines, the switches cause a signal lamp (not shown) to light and an alarm bell (not shown) to ring, thus informing the operator that the supply of flanges in the magazines is approaching exhaustion.

*Station B.—Feeding hub members into the nest*

At station B, where hub members are placed atop the bottom flanges, a base plate 77 (FIGS. 11 and 12) is attached to the work shelf 15 by means of support block 78, and extends over whichever nest 18 is aligned with this station. Two holes 79 and 80 are located in the plate 77 above and coaxial with the two nest recesses 40 (FIG. 9) and with the two bottom flanges previously injected into the nest at station A. Thus, when a hub is placed in either hole 79 or 80, it drops directly into the nest atop the bottom flange. A hub transfer member 81, provided to drop one hub member at-a-time into the nest, comprises a sector-shaped member pivoted about point 82. Two holes 83, and 84, are located in the hub transfer member so that when hole 83 is coaxial with hole 79 in the plate 77 as shown by the solid lines in FIG. 11, hole 84 is coaxial with, and directly beneath magazine tube 85. When hub transfer member 81 is pivoted to its other extreme position, hole 84 is coaxial with hole 80 in plate 77 is shown by the dotted lines in FIG. 11 and hole 83 is coaxial with, and directly beneath magazine tube 85. By means of a detent mechanism to be described later, each time one hub member drops from a hole in the transfer member into the nest, another hub member simultaneously drops from the magazine into the other hole in hub transfer member 81 onto plate 77. During each operating cycle, the hub transfer member moves from its initial position to the opposite position and then returns to its initial position, thus loading two hubs into the nest. Reciprocal movement of the hub transfer member is effected by double-acting air cylinder 86, controlled by a cam-actuated solenoid valve (not shown), and connected to the hub transfer member by linkage 87. In the initial position of the hub transfer member, a single hub drops from magazine tube 85 into hole 84 and rests upon the top surface of the base plate. When the hub transport member is moved to bring hole 84 containing the hub into a coaxially-aligned position over hole 80 in plate 77, the hub is no longer supported by the plate and drops through the hole into proper position in the nest atop the bottom flange. Simultaneously, hole 83 is coaxial with, and directly beneath the magazine tube allowing a hub to drop from the magazine tube into hole 83 which is blocked at its lower end by plate 77. The actuation of the air cylinder in the opposite direction then returns the hub transport member to its initial position. During this movement, the hub in hole 83 slides over plate 77 until it is over hole 79 through which it drops into the nest atop the bottom flange. At the same time, another hub drops out of the magazine tube and into hole 84, which is now blocked at its bottom end by the top surface of the plate.

The magazine tube 85 is supported in its vertical position by a block 88 fixed to the base plate. A vertical column of coaxially arranged hubs is maintained in the magazine tube by means of a vibratory bowl feeding devices which is supplied with randomly-arranged hubs from a vibratory feed hopper. These units are schematically illustrated at station B in FIG. 6. A means of electric control (not shown) is used to insure a rate of feed sufficient to maintain a continuous supply of vertically arranged hubs to the magazine tube. Both the vibratory bowl feeding device and vibratory feed hopper are furnished by The Syntron Company, Homer City, Pennsylvania. Neither of these devices, however, are claimed as a part of the present invention. Photoelectric sensing means (not shown) are located near the top and bottom of the magazine tube for detecting and indicating an absence of hubs within the magazine tube.

To insure that a single hub drops from the magazine tube into whichever hole of the hub transport member is in alignment therewith, and to insure that another hub cannot drop simultaneously to cause an obstruction across gap 89 (FIG. 12), lever 90 is fitted with plastic-faced pad 91 projecting through slot 92 one hub length above the bottom of the magazine tube. Lever 90 is pivoted about point 93 and is loaded by spring 94 to cause pad 91 to bear against the hub adjacent thereto, to support the column of hubs within the magazine tube and to prevent it from bearing on the upper surface of the hub within the hub transfer member. A cam roller 95 is mounted at the bottom of lever arm 91 and bears against the profile of cam 96 on the face of the hub transfer member. When either hole in the hub transfer member is coaxial with the magazine tube, the cam roller is adjacent the recessed portion of the cam, and the pad 91 bears against the adjacent hub in the magazine tube. During movement of the hub transfer members, when neither hole therein is aligned with the magazine tube, the cam roller rides onto the raised portion of the cam 96. This causes pad 91 to release thereby allowing the entire column of hubs within the magazine to drop a distance of one hub length, the bottom hub then being supported on surface 97 of the hub transfer member between holes 83 and 84. As the hub transfer member continues its movement, but before either of the holes of that member again comes into alignment with the corresponding hole in the base plate, the cam roller follows the cam profile to the recessed portion and the second hub in the column is clamped by pad 91. Only the bottom hub is then supported on the surface 97, and when the continued movement of the hub transport member brings hole 83 or 84 into coaxial alignment with the magazine, the hub drops into the hole in the transport member.

Figure 11:
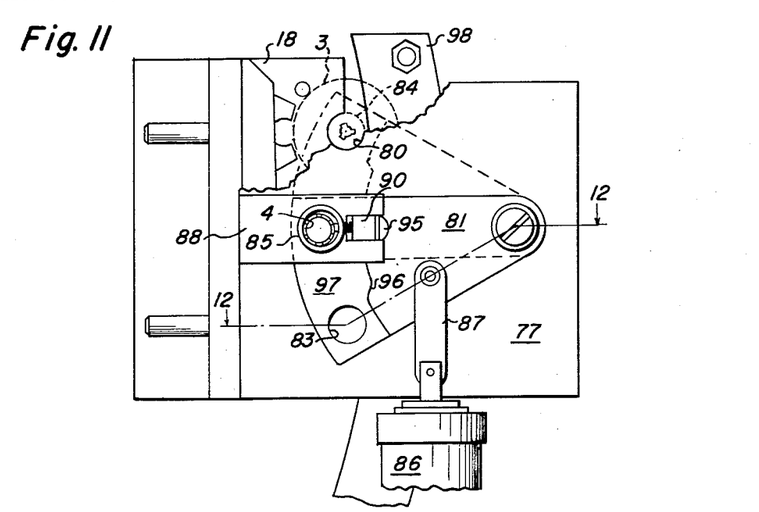
FIG. 11 is a top plan view of the hub loading mechanism at station B.
Figure 12:
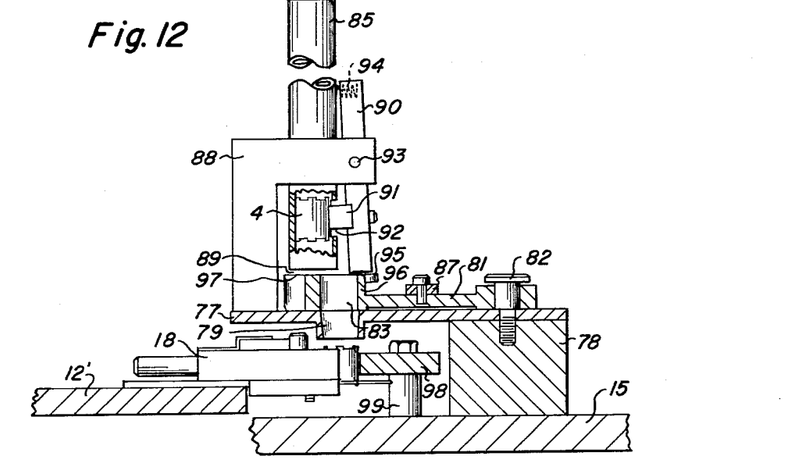
FIG. 12 is a sectional side view of the hub loading mechanism at station B taken substantially along the line 12—12 of FIG. 11.

To insure that the hubs are retained in the nest recesses during indexing an arcuate guide rail 98 is fixed to the work shelf on spacers 99. The guide rail extends from a position just ahead of station B as shown in FIG. 11 to station G (FIG. 6). The inner surface of the guide rail is concentric with the indexing table 12', and tangent to the peripheries of the hubs in the nests. Sufficient clearance between the rail and the hubs is provided to prevent binding during indexing.

Station C.—Registering hubs and bottom flanges

When the nest arrives at station C (FIG. 13), each bottom flange member has a hub resting thereupon, but the lower lugs of the hub are not necessarily registered with the corresponding holes in the flange. At station C the hub members are registered with the flanges so that the tips of lower lugs on the hubs project through the corresponding holes in the bottom flange. This work station comprises a vertical support member 100 with two horizontal bearing support blocks 101 and 102 attached thereto in parallel spaced relation. Two oscillatory spindles 103 are slidably and rotatably supported in bearings 104 located in the support blocks. Each of the spindles is constantly oscillated by a chain driven sprocket 105 which engages the spindle through pin 106 projecting into longitudinal slot 107 in the spindle. This construction allows the spindle to slide vertically while being oscillated by the sprocket. Both driven sprockets 105 are connected by chain 108 to driving sprocket 109. The driving sprocket is oscillated by means of connecting rod 110, which links eccentric pin 111 on the face of the driving sprocket with a similar pin 112, having a smaller radius of rotation, on eccentric arm 113. The eccentric arm is constantly rotated on shaft 114 by means of an electric motor 115 which has a built-in gear reduction unit.

Figure 13:
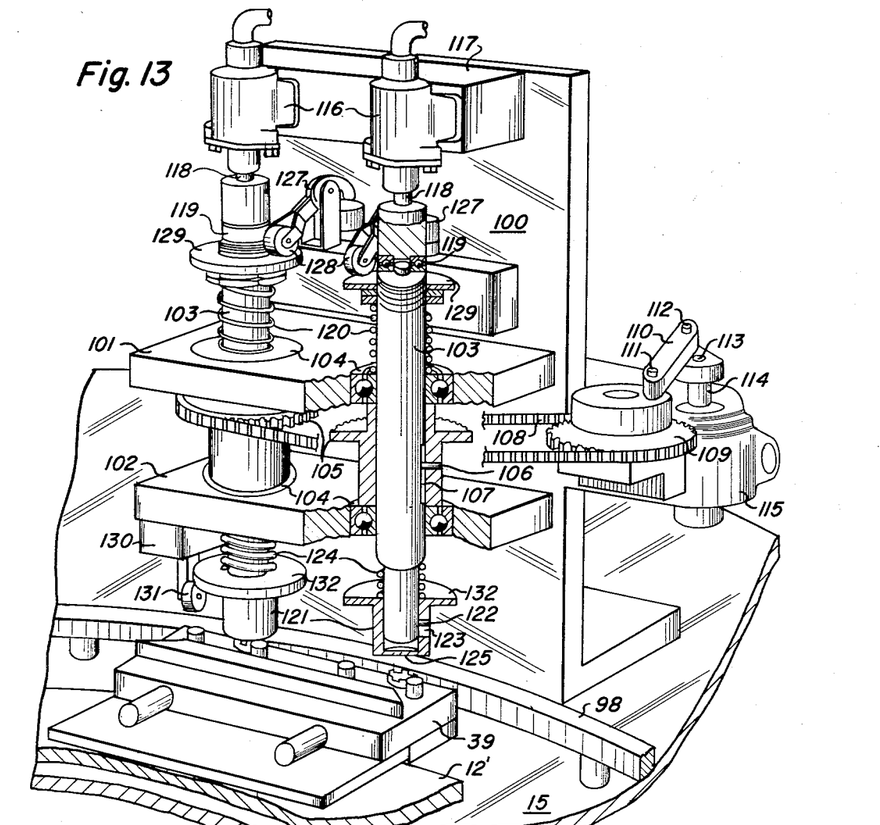
FIG. 13 is a perspective view of the mechanism used to register the lower hub lugs with the holes in the bottom flange in the nest at station C.

An air cylinder 116 is mounted on block 117 directly above each spindle in such a manner that the actuation of the air cylinder causes the spindle to slide downward through bearings 104 and driven sprocket 105. The downward motion of the spindle is limited by the length of the stroke of the piston rod 118 in the air cylinder. A thrust bearing 119 is provided between the spindle and the piston rod to prevent transmission of the oscillatory motion of the spindle to the piston rod. Return springs 120 are provided on each spindle to raise the spindle clear of the nest.

Figure 14:
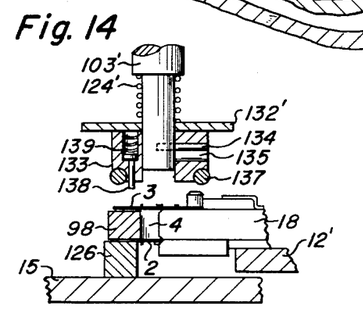
FIG. 14 is a sectional view through the top flange registering clutch mechanism which is employed at station E with a mechanism as shown by FIG. 13.

Each spindle is provided at its lower end with a hub-driving clutch 121, which transmits oscillatory motion from the spindle to the hub member. The clutch is caused to oscillate with the spindle by pin 122 riding in the longitudinal slot 123. The clutch is slidable relative to the spindle within the limits defined by the abutment of the pin with the ends of the slot. The clutch is lightly loaded by a spring 124 to cause the bottom surface of the clutch member to exert a slight downward pressure against the top lugs of the hub while the hub is being oscillated by the frictional contact between the lower clutch face 125 and the upper lugs on the hub. A support plate 126 (FIG. 14) for the outer edge of the bottom flange is attached to the work shelf and maintains the bottom flanges in proper position in the nest against the downward pressure exerted by the driving clutch.

When the nest containing the bottom flanges and hubs has been aligned with the hub registration station, a cam on the auxiliary camshaft 30 (FIG. 7) causes the air cylinders 116 (FIG. 13) to force the oscillating spindles 103 to their lowest position. In this position, the lower faces 125 of the oscillating clutches are resiliently pressed against the tops of the hubs by springs 124. Frictional contact between the clutches and the hubs causes the hubs to assume to the oscillatory motion of the clutches which, in combination with the downward pressure exerted on the hubs by springs 124, causes the lugs at the bottom of the hubs to register with the holes in the bottom flanges. After a predetermined interval, a cam on the auxiliary camshaft causes the air to be released from air cylinders 116, allowing springs 120 to raise the spindles to the position shown by FIG. 13.

Electric switches 127, actuated by rollers 128 riding against adjustable disks 129, are employed in a suitable relay circuit to insure that subsequent indexing cannot occur until both spindles are clear of the nest. Switches 130 are actuated by rollers 131 bearing against the disks 132, if their respective clutches drop far enough to indicate the absence of a hub member in the nest. The actuation of either of these switches energizes an alarm system and prevents subsequent operations from being performed at the next station.

Station D.—Inserting top flanges into the nest

At station D, top flanges 2 (FIG. 2) with their convex center sections 7 (FIG. 5) facing upward, are injected into the nest atop the registered hubs and bottom flanges. The method and structure used for injecting top flanges are the same as are used to inject bottom flanges at station B, except that the loading rod is arranged to accept only flanges having a four-spline opening, and an elevating block (not shown) is placed beneath base 55 to bring the plane of injection into proper horizontal alignment with the nest.

Station E.—Registering top flanges with hubs

When the nest arrives at station E, the hubs and bottom flanges are in registry, but the holes in the top flanges are not necessarily registered with the upper lugs on the hubs. At this station, each top flange is oscillated to register the top flange holes with the upper lugs on the hubs. The means used for accomplishing this operation are the same as are employed at station C, where the hubs are registered with the holes in the bottom flanges, except that a different construction is used for the clutch member at the lower end of each oscillating spindle. Each top flange oscillating clutch comprises a body member 133 (FIG. 14) having a diameter roughly equal to that of the top flanges. Each clutch is slidably mounted on the oscillating spindle 103', but is prevented from rotating relative to the spindle by pin 134 riding in slot 135. Each clutch exerts a slight downward pressure upon the top flange under the influence of coil spring 124'. A resilient O-ring 137 is seated upon an annular shoulder in the lower face of the clutch to provide a resilient contact surface between the clutch and top flange. A plurality of stripper pins 138 are provided in axial holes concentric about the clutch axis. These stripper pins exert a very slight pressure in a downward direction under the influence of coil springs 139. These pins prevent the registered top flanges from being lifted off the hubs when the oscillating clutches are raised.

Disks 132' at the top of the clutches are similar to disks 132 (FIG. 13) at station C and serve the same purpose.

Station F.—Blank work station

After the top flanges are registered with the hubs in the nest at station E, indexing table 12 (FIG. 7) carries the nest into alignment with station F, where no operations are performed. This construction permits the use of a commercially-available, 8-station indexing mechanism 14 and provides a spare station.

Station G.—Riveting the top and bottom flanges to the hub

Figure 15:
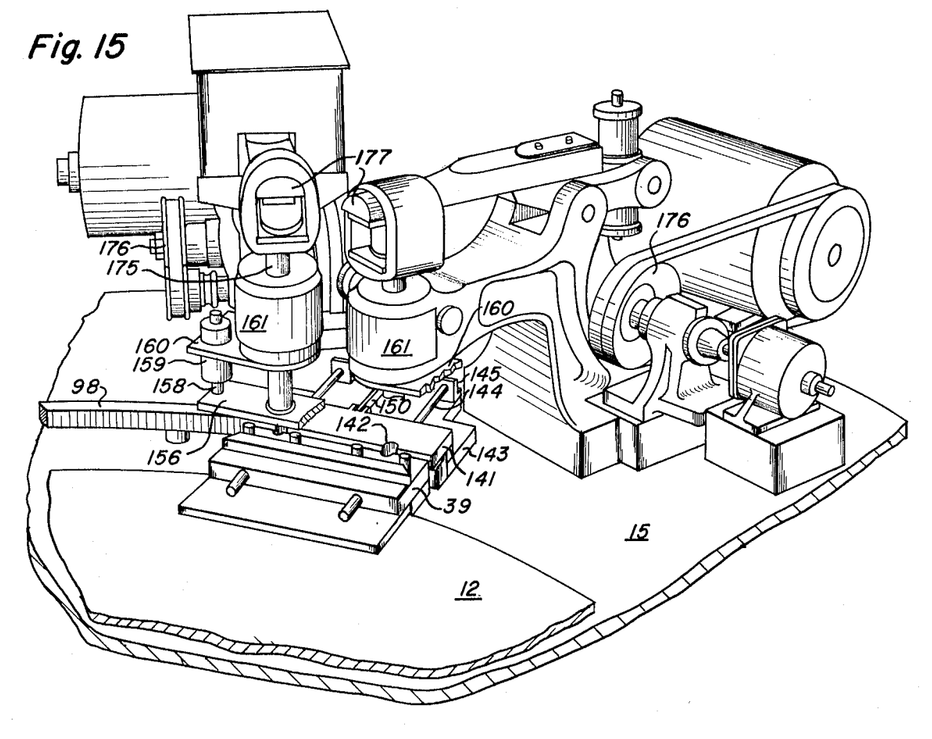
FIG. 15 is a perspective view of the riveting mechanism at station G.
Figures 16, 17:
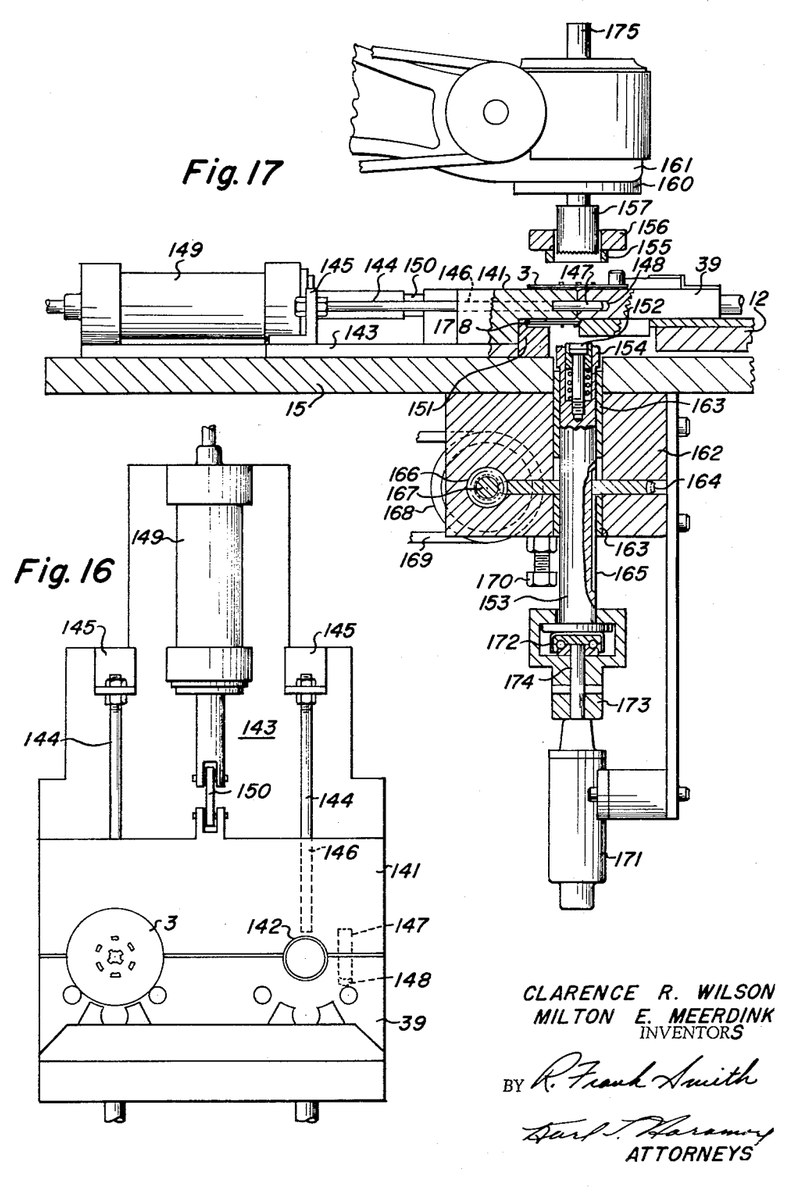
FIG. 16 is a top plan view of the checker plate and nest at the riveting station G.
FIG. 17 is a fragmentary sectional side view taken through station G.

When the nest arrives at station G (FIGS. Nos. 15, 16 and 17) the flanges and hubs are registered with the tips of the upper and lower lugs on the hubs protruding through the corresponding holes in the top and bottom flanges. At station G, these lug tips are riveted to permanently attach the flanges to the hubs. In order to provide a solid support for the spool, and to insure that the flanges remain parallel during the riveting operation, the spool components are securely clamped before being riveted.

The first step in the clamping operation employs a cheeker plate 141 which cooperates with nest body 39 to form a solid structure completely filling the space defined by the outer periphery of the hub and the inner surfaces of the flanges. The cheeker plate is similar in construction to the body member of the nest, having two semicylindrical recesses 142 therein to accommodate the hubs and having sufficient depth to properly space the top and bottom spool flanges. This cheeker plate is slidably mounted on base plate 143 by means of horizontal guide rods 144, attached to supports 145 and passing through holes 146 in the cheeker plate. Side gibs (not shown) are also used to provide an additional guiding means for the sliding cheeker plate. Pins 147 in the face of the cheeker plate, fit into mating holes 148 (FIGS. 8 and 17) in the face of the nest body. Air cylinder 149 (FIGS. 15 and 16) controlled by a cam on the auxiliary camshaft 30, is attached to the base plate 143 and, through a linkage 150, moves the cheeker plate into and out of engagement with the nest.

After the cheeker plate engages with the nest, pressure is applied against the upper and lower surfaces respectively, of the top and bottom flanges to insure that the flanges are firmly seated against the hubs and are parallel during the riveting operation and, at the same time, to prevent undue distortion of the flanges from riveting action.

The bottom flange is maintained in contact with the lower surface of the nest and cheeker plate by pressure buttons 43 (FIG. 8) located in the nest body 39 and by support block 151 (FIG. 17) mounted on work shelf 15. Additional support for the lower flange is also provided by spring-loaded pressure pad 152 which bears upwardly against the center of the bottom flange when the lower spindle 153 is raised to bring the lower anvil 154 into contact with the lower lugs. In order to clamp the top flange firmly against the top surfaces of the nest and cheeker plate, a clamping pad 155 is provided above each spool assembly, and is pressed downwardly against each top flange. The clamping pads are mounted on plate 156 in such a manner that the upper anvils 157 pass through the plate and the center holes of the clamping pads. Plate 156, with the pads mounted on the bottom surface thereof, is supported by piston rods 158 of air cylinders 159, only one of which is shown in FIG. 15, which is attached to the main casting of one of the riveting hammers 161. The simultaneous actuation of air cylinders 159, only one of which is shown in FIG. 15, by a cam on the auxiliary camshaft 30 causes the clamping pads to be forced downward into clamping position.

When the spool components are firmly clamped, the riveting anvils 154 and 157 (FIG. 17) are brought to bear against the lower and upper lug tips respectively, and the upper anvil 157 is subjected to a series of hammer blows which effect the riveting action. Both anvils are rotated during the riveting operation to provide uniform deformation of the lugs, and to minimize distortion of the hub and flange members. The mechanism by which the lower anvil is raised against the bottom lugs and is caused to rotate is illustrated by FIG. 17. Block 162 is attached to the under side of the work shelf 15 and supports sleeve bearings 163. Spindle 153 is slidably located in the bearings 163 and is constantly rotated by a gear 164 connected to the spindle by an internal key (not shown) riding in the longitudinal slot 165. Gear 164 is driven by a worm 166 on the shaft 167, which is rotated by an electric motor (not shown) through pulley 168 and belt 169. Vertical motion of the spindle 153 is limited by the adjustable stop 170, and results when the air cylinder 171 is actuated by a cam on the auxiliary camshaft 30. The upward motion of the spindle raises the anvil 154 attached thereto against the lower lugs of the hub. Thrust bearing 172 in spindle-retracting yoke 173 prevents the transmission of spindle rotation to the piston rod 174 of the air cylinder.

Each upper anvil 157 is located at the bottom end of a spindle 175 extending through the head of a commercially-available, high-speed hammer. The riveting hammers are furnished by The High Speed Hammer Company, Inc., 313 Norton Street, Rochester 21, N.Y., but are not claimed as part of the present invention. Spindle 175 is caused to constantly rotate in the same direction, and at approximately the same speed, as the lower spindle 153 by means of a gear drive mechanism built into the hammer.

After the spool components are securely clamped, a cam on the auxiliary camshaft 30 actuates clutch 176 causing hammer arms 177 to repeatedly strike the upper ends of spindles 175. The repeated blows of the upper anvils against the top surface of the upper lugs deform the lugs into the desired shape, and the force of these blows is also transmitted through the hubs to cause a corresponding deformation of the bottom lugs against the lower anvils.

After a predetermined time, a cam on the auxiliary camshaft releases clutches 176 to stop operation of the riveting hammers. The upper clamping pad 155, upper anvil 157, lower spindle 153 and lower anvil 154 are then withdrawn from contact with the spools in the nest. After these elements are withdrawn, air cylinder 149 withdraws the cheeker plate 141 from engagement with the nest. Lip 178 on the top surface of support 151 prevents finished spools from being drawn out of the nest when the cheeker plate is retracted.

*Station H.—Ejecting assembled spools from the nest*

Figure 18:
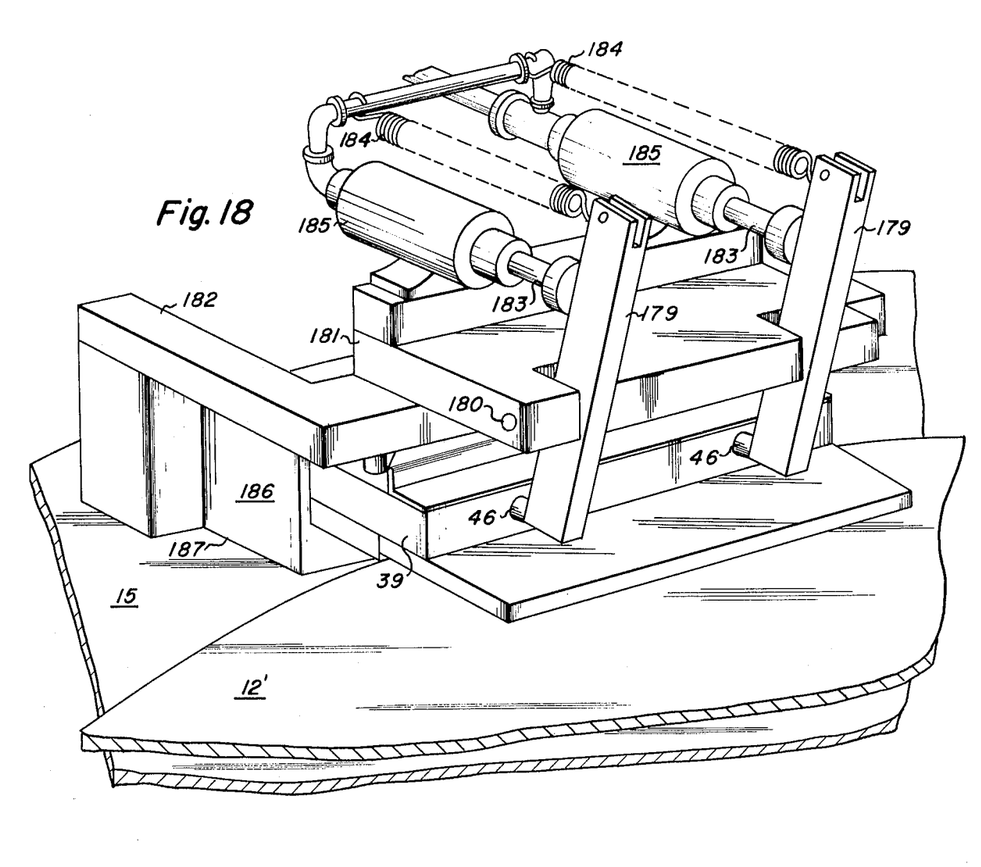
FIG. 18 is a perspective view of the spool ejecting mechanism at station H.

When the nest containing the completely assembled spools is aligned with station H, the spools are ejected from the nest and removed from the machine. To accomplish this operation, a pair of ejector levers 179 (FIG. 18), the bottom ends of which are in alignment with ejector rods 47 are pivotally supported by pin 180 in block 181, supported by bracket 182. The upper ends of the levers are in contact with piston rods 183. The ejector levers are retained out of contact with the ejector rods by springs 184 until a cam on the auxiliary camshaft 30 causes air cylinders 185 to move the ejector levers to the position shown in FIG. 18, thus depressing the ejector rods, which cause the ejector blades 44 (FIG. 8) to push the completely assembled spools out of the nest. When air is released from the air cylinders by action of a cam on the auxiliary camshaft, the ejector levers are returned by their springs to their initial position clear of the nest. As the spools drop out of the nest, they are guided by a sheet metal enclosure 186 through a hole 187 in the work shelf 15 into an inclined chute (not shown) leading to a storage box.

Various modifications of the invention are possible without departing from the spirit thereof. For example, the spool flanges might be attached to the hub by welding or by some other technique instead of by riveting. The present disclosure, therefore, is to be construed in an illustrative sense and the scope of the invention is defined by the following claims.

Having now particularly described our invention what we desire to secure by Letters Patent of the United States and what we claim is:

1. In a machine for automatically assembling spools having a tubular hub with a first flange attached to one end thereof and a second flange attached to the other end thereof, the combination comprising; an endless conveyor, a work holding nest attached to said conveyor and including means adapted to receive said first flange, said second flange and said hub therein and to support said first flange therein in a horizontal plane, a plurality of work stations located in stationary spaced relation adjacent and along the path of the nest carried by said conveyor, an indexing mechanism to intermittently advance said conveyor to successively locate said nest in stationary operational alignment with each of said work stations, the first of said work stations comprising a vertical tubular magazine adapted to accommodate a column of first spool flanges and a reciprocable injector blade adapted to engage the edge of a first flange in said column in said magazine and to feed said first flange out of said column and said magazine and into said nest when said nest is in operational alignment with said first work station; means at the second of said work stations comprising a vertical tubular magazine to accomodate a column of tubular hubs and a mechanism to feed a vertically disposed hub out of said column in said magazine and onto said first flange in said nest when said nest is in operational alignment with said second work station; means at the third of said work stations corresponding substantially in structure to said means at said first work station and adapted to horizontally feed a second flange onto said hub in said nest when said nest is in operational alignment with said third work station; means at the fourth of said work stations for permanently joining said first and second flanges in said nest to the corresponding ends of said hub in said nest to form a completed spool when said nest is in operational alignment with said fourth work station; reciprocating means at one of said work stations adapted to eject said completed spool from said nest; and automatic control means interconnecting said conveyor indexing mechanism with said feeding, joining and ejecting means at said work stations to cause said last mentioned means at said work stations to function only when said nest is in operational alignment with one of said work stations and to cause said conveyor to index to bring said nest into stationary operational alignment with the succeeding work station only after said last mentioned means at said work stations have performed their respective functions.

2. A machine for automatically assembling spools according to claim 1 and including means adjacent the path of said nest for detecting the absence of the proper spool components in said nest, and means responsive to said detecting means for paralyzing said feeding means at one of said work stations when any of the proper components are absent from said nest when said nest is brought into operational alignment with said one of said work stations.

3. In a machine for automatically assembling spools having components comprising a tubular hub, a first flange joined to one end thereof and a second flange joined to the other end thereof, a work holding nest adapted to locate and support the components of said spool when said components are placed in said nest and while said components are joined together to form a completed spool, said work holding nest comprising in combination; a body member including a first surface adapted to horizontally locate said first flange, a second surface parallel to said first surface, a face joining said first and second surfaces and normal therewith and provided with a semi-cylindrical hub locating recess whose axis is normal to said first and second surfaces, first locating means associated with said first surface to engage the periphery of said first flange to locate said first flange on said first surface coaxial with said hub receiving recess and to engage the face of said first flange to hold that portion of said first flange adjacent thereto against said first surface, said first locating means being so disposed as to allow access to said first flange for performing operations necessary to join said first flange to said hub, second locating means associated with said second surface of said body member to engage the periphery of said second flange to locate said second flange adjacent said second surface coaxial with said hub receiving recess, said second flange locating means being so disposed as to allow access to said second flange for performing operations necessary to join said second flange to said hub to form a completed spool, and means for ejecting a completed spool from said nest, said means including an ejector member movably connected to said nest body and adapted to be moved transversely of the axis of said hub receiving recess between an inoperative position in which said ejector member is retracted from the area of the nest occupied by any of said spool components located in said nest, and an operative position in which a completed spool in said nest is displaced from the nest thereby.

4. In a machine for automatically assembling spools having a tubular hub with a first flange having a center hole of one configuration attached to one end thereof and a second flange having a center hole of a second configuration different from that of said first flange attached to the other end thereof, said machine including a flange feeding station, and a work holding nest movable to and from operational alignment with said flange feeding station; means at said flange feeding station comprising a base plate, a vertical tubular magazine located on said base plate and having an open upper end through which a column of flanges may be loaded into said magazine, means for loading into said magazine only those flanges having a center hole of a particular configuration and for preventing the loading of flanges having a center hole of a different configuration into said magazine, said last-mentioned means including a loading rod having a cross section corressponding to said particular configuration to allow only flanges having center holes of said particular configuration to be stacked thereon, said rod being pivotally mounted above said magazine and movable between a horizontal position wherein flanges having center holes of said particular configuration may be stacked thereon and a vertical position in which said loading rod is coaxial with said magazine and projects into the upper end of said magazine to allow the stack of flanges thereon to be slid downwardly off said loading rod into said magazine, a lid hingedly affixed to the top of said magazine and having an open and a closed position relative to said open upper end of said magazine, and means operatively connecting said lid with said loading rod to move said lid to said closed position when said loading rod is moved to said horizontal position and to move said lid to said open position when said loading rod is moved to said vertical position to allow the insertion into the magazine of only those flanges that have previously been slid onto said loading rod, and flange feeding means comprising an injector blade slidably located in said base plate and adapted to engage the edge of the lowermost flange in said column in said magazine and means to move said injector blade to feed said lowermost flange out of said column and into said nest when said nest is in operational alignment with said flange loading station.

5. In a machine for automatically assembling spools having a tubular hub with a first flange attached to one end thereof and a second flange attached to the other end thereof, said machine comprising a plurality of stations, a work holding nest, and means to move said nest into operational alignment with different ones of said stations; a hub loading station for placing a hub vertically in said work holding nest when said nest is in operational alignment with said hub loading station, said hub loading station comprising in combination; a horizontal base plate provided with a vertical guide hole so disposed therein that a hub axially aligned with the top of said guide hole will drop through said guide hole into said nest when said nest is in operational alignment with said hub loading station, a hub transport member movably mounted on the upper surface of said base plate and provided with a vertical hub transport hole therein, a tubular magazine vertically supported over said hub transport member and adapted to accommodate a column of tubular hubs, power actuated means connected to said hub transport member to cause said hub transport hole to be alternately brought into axial alignment with said hub magazine and into axial alignment with said guide hole, and means to feed only one hub out of said magazine and into said hub transport hole each time said hub transport hole is axially aligned with said magazine, said last-mentioned means comprising a braking pad movable into said magazine to support all but the lowermost hub therein, a cam surface integral with said hub transport member, and means operatively connecting said braking pad with said cam surface whereby said braking pad is moved into said magazine before said hub transport hole is brought into axial alignment with said magazine and is withdrawn from said magazine to allow the column of hubs in said magazine to drop onto the top surface of said transport member when said hub transport hole is out of alignment with said magazine.

6. In a machine for automatically assembling spools having a tubular hub with a circular flange permanently attached to each end thereof by means of a plurality of lugs on each end of said core projecting through corresponding holes in said flanges and riveted to secure said flanges to said hub, said machine comprising a work holding nest, a plurality of work stations including work stations comprising means for inserting spool components into said nest, and means to move said nest into operational alignment with different ones of said work stations whereby components of said spool are inserted into said nest in contacting coaxial relation but with the adjacent lugs and holes of the contacting components not necessarily in registry; a registering station to register the adjacent lugs and holes of the contacting components in said nest when said nest is in operational alignment with said registering station, said registering station comprising in combination; a bearing member, a spindle slidably and rotatably supported by said bearing member in coaxial relation with the spool components carried by said nest when said nest is in operational alignment with said registering station, means to impart constant oscillatory motion to said spindle, a clutch member resiliently located at one end of said spindle to engage and transmit said oscillatory motion to one of said spool components in said nest, means to bring said oscillating clutch means into driving engagement with the spool component to be oscillated, and means to return said spindle and said clutch member to a retracted position after the adjacent lugs and holes of the contacting components in said nest have been registered.

7. In a machine for automatically assembling spools having a tubular hub with a flange attached to each end thereof, said machine including a work holding nest adapted to contain a completed spool and having a spool ejector member movably connected to said nest to move from an inoperative position wherein said ejector member is retracted from the area of the nest occupied by any of the spool components in the nest to an operative position in which the completed spool is displaced from the nest by said ejector member, a plurality of work stations, and means to move said nest into operational alignment with different ones of said work stations; a spool ejecting station for removing said completed spool from said nest when said nest is in operational alignment with said spool ejecting station, said spool ejecting station comprising; a support bracket overhanging said nest when said nest is so aligned with said spool ejecting station, an ejector member actuating bar movably supported on said bracket in operational alignment with said ejector member when said nest is so aligned with said spool ejector station, spring actuated means yieldably retaining said bar clear of said nest and out of contact with said ejector member, and power actuated means to move said bar toward said nest to engage and move said ejector member to said operative position while said nest is so aligned with said ejector station.

References Cited in the file of this patent

UNITED STATES PATENTS

| | | |
|---|---|---|
| 2,155,958 | Schmidt | Apr. 25, 1939 |
| 2,621,824 | Gookin | Dec. 16, 1952 |
| 2,670,705 | Herrold | Mar. 2, 1954 |